(12) United States Patent
Walker et al.

(10) Patent No.: US 7,966,520 B2
(45) Date of Patent: Jun. 21, 2011

(54) SOFTWARE LICENSING FOR SPARE PROCESSORS

(75) Inventors: William T. Walker, Evergreen, CO (US); Robert J. Serkowski, Broomfield, CO (US); David L. Chavez, Thornton, CO (US); Phillip A. Whelan, Thornton, CO (US); Robin L. Chalmeta, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 1816 days.

(21) Appl. No.: 10/232,647

(22) Filed: Aug. 30, 2002

(65) Prior Publication Data
US 2004/0044630 A1    Mar. 4, 2004

(51) Int. Cl.
*H02H 3/05* (2006.01)
*G11C 29/00* (2006.01)
(52) U.S. Cl. ............... 714/15; 714/13; 714/23
(58) Field of Classification Search .......... 705/59; 710/200; 714/10, 11, 15; 709/203
See application file for complete search history.

(56) References Cited

U.S. PATENT DOCUMENTS

| | | | |
|---|---|---|---|
| 4,288,659 A | 9/1981 | Atalla | 178/22.08 |
| 4,405,829 A | 9/1983 | Rivest et al. | |
| 4,780,821 A | 10/1988 | Crossley | |
| 4,811,393 A | 3/1989 | Hazard | 380/21 |
| 4,888,800 A | 12/1989 | Marshall et al. | 380/21 |
| 4,937,863 A * | 6/1990 | Robert et al. | 710/200 |
| 5,005,122 A | 4/1991 | Griffin et al. | |
| 5,023,907 A | 6/1991 | Johnson et al. | |
| 5,157,663 A * | 10/1992 | Major et al. | 714/10 |
| 5,179,591 A | 1/1993 | Hardy et al. | 380/21 |
| 5,204,897 A * | 4/1993 | Wyman | 710/200 |
| 5,206,903 A | 4/1993 | Kohler et al. | |
| 5,230,020 A | 7/1993 | Hardy et al. | 380/21 |
| 5,260,999 A | 11/1993 | Wyman | |
| 5,307,481 A * | 4/1994 | Shimazaki et al. | 714/11 |
| 5,329,570 A | 7/1994 | Glassmacher et al. | 379/189 |
| 5,341,427 A | 8/1994 | Hardy et al. | 380/21 |
| 5,347,580 A | 9/1994 | Molva et al. | |
| 5,386,369 A | 1/1995 | Christiano | |

(Continued)

FOREIGN PATENT DOCUMENTS

EP    1 071 253 A1    1/2001

(Continued)

OTHER PUBLICATIONS

U.S. Appl. No. 09/357,679, filed Jul. 20, 1999, Serkowski.

(Continued)

*Primary Examiner* — Evens J Augustin
(74) *Attorney, Agent, or Firm* — Sheridan Ross P.C.

(57) ABSTRACT

A system is provided for controlling a right to use a computational component, comprising (a) a backup computational component 102 associated with a primary computational component 150, wherein when the primary computational component is in an operational mode the backup computational component is in a standby mode; (b) an activation agent 154 operable to determine when the primary computational component is no longer in the operational mode; (c) a timer 126 associated with the backup computational component; and (d) a mode setting agent 124 operable to permit the backup computational component to change to the operational mode when the value of the license error timer is not zero and to not permit the backup computational component to change to the operational mode when the value of the license error timer is zero.

30 Claims, 6 Drawing Sheets

U.S. PATENT DOCUMENTS

| | | | |
|---|---|---|---|
| 5,390,297 A | 2/1995 | Barber et al. | |
| 5,408,649 A * | 4/1995 | Beshears et al. | 714/10 |
| 5,448,639 A | 9/1995 | Arazi | |
| 5,553,143 A | 9/1996 | Ross et al. | |
| 5,563,946 A | 10/1996 | Cooper et al. | |
| 5,579,222 A | 11/1996 | Bains et al. | |
| 5,629,980 A | 5/1997 | Stefik et al. | |
| 5,646,992 A | 7/1997 | Subler et al. | |
| 5,671,412 A * | 9/1997 | Christiano | 1/1 |
| 5,673,315 A | 9/1997 | Wolf | |
| 5,699,431 A | 12/1997 | Van Oorschot et al. | 380/30 |
| 5,708,709 A | 1/1998 | Rose | 705/59 |
| 5,717,604 A | 2/1998 | Wiggins | 709/229 |
| 5,724,428 A | 3/1998 | Rivest | |
| 5,742,757 A | 4/1998 | Hamadani et al. | |
| 5,745,569 A | 4/1998 | Moskowitz et al. | |
| 5,745,576 A | 4/1998 | Abraham et al. | 380/25 |
| 5,745,879 A | 4/1998 | Wyman | 705/1 |
| 5,754,761 A | 5/1998 | Willsey | |
| 5,758,068 A | 5/1998 | Brandt et al. | 726/27 |
| 5,758,069 A | 5/1998 | Olsen | |
| 5,790,074 A | 8/1998 | Rangedahl et al. | 342/357.13 |
| 5,790,664 A * | 8/1998 | Coley et al. | 709/203 |
| 5,796,941 A | 8/1998 | Lita | |
| 5,828,747 A | 10/1998 | Fisher et al. | |
| 5,835,600 A | 11/1998 | Rivest | |
| 5,864,620 A | 1/1999 | Pettitt | |
| 5,905,793 A | 5/1999 | Flockhart et al. | |
| 5,905,860 A | 5/1999 | Olsen et al. | 395/187.01 |
| 5,935,243 A | 8/1999 | Hasebe et al. | |
| 5,940,504 A | 8/1999 | Griswold | 705/59 |
| 5,956,505 A | 9/1999 | Manduley | |
| 5,956,716 A | 9/1999 | Kenner et al. | |
| 5,960,085 A | 9/1999 | de la Huerga | |
| 5,978,565 A * | 11/1999 | Ohran et al. | 714/13 |
| 5,982,873 A | 11/1999 | Flockhart et al. | |
| 5,995,625 A | 11/1999 | Sudia et al. | |
| 6,006,016 A | 12/1999 | Faigon et al. | |
| 6,009,401 A | 12/1999 | Horstmann | |
| 6,011,973 A | 1/2000 | Valentine et al. | 455/456.6 |
| 6,023,763 A | 2/2000 | Grumstrup et al. | |
| 6,023,766 A | 2/2000 | Yamamura | |
| 6,047,242 A | 4/2000 | Benson | |
| 6,067,621 A | 5/2000 | Yu et al. | |
| 6,108,703 A | 8/2000 | Leighton et al. | 709/226 |
| 6,128,389 A | 10/2000 | Chan et al. | |
| 6,134,660 A | 10/2000 | Boneh et al. | |
| 6,148,415 A * | 11/2000 | Kobayashi et al. | 714/15 |
| 6,163,607 A | 12/2000 | Bogart et al. | |
| 6,173,053 B1 | 1/2001 | Bogart et al. | |
| 6,178,511 B1 | 1/2001 | Cohen et al. | |
| 6,189,146 B1 | 2/2001 | Misra et al. | |
| 6,192,122 B1 | 2/2001 | Flockhart et al. | |
| 6,212,635 B1 | 4/2001 | Reardon | |
| 6,219,652 B1 | 4/2001 | Carter et al. | |
| 6,223,291 B1 | 4/2001 | Puhl et al. | |
| 6,246,871 B1 | 6/2001 | Ala-Laurila | |
| 6,314,565 B1 | 11/2001 | Kenner et al. | |
| 6,343,280 B2 | 1/2002 | Clark | |
| 6,360,320 B1 | 3/2002 | Ishiguro et al. | |
| 6,381,747 B1 | 4/2002 | Wonfor et al. | |
| 6,414,595 B1 | 7/2002 | Scrandis et al. | |
| 6,421,726 B1 | 7/2002 | Kenner et al. | |
| 6,442,708 B1 | 8/2002 | Dierauer et al. | |
| 6,463,534 B1 | 10/2002 | Geiger et al. | |
| 6,502,079 B1 | 12/2002 | Ball et al. | 705/59 |
| 6,513,117 B2 | 1/2003 | Tarpenning et al. | |
| 6,513,121 B1 | 1/2003 | Serkowski | 713/201 |
| 6,539,481 B1 | 3/2003 | Takahashi et al. | |
| 6,557,105 B1 | 4/2003 | Tardo et al. | |
| 6,574,612 B1 * | 6/2003 | Baratti et al. | 705/59 |
| 6,584,454 B1 * | 6/2003 | Hummel et al. | 705/59 |
| 6,615,347 B1 | 9/2003 | de Silva et al. | |
| 6,640,305 B2 | 10/2003 | Kocher et al. | |
| 6,654,888 B1 | 11/2003 | Cooper et al. | |
| 6,675,208 B1 | 1/2004 | Rai et al. | |
| 6,697,945 B2 | 2/2004 | Ishiguro et al. | |
| 6,704,885 B1 * | 3/2004 | Salas-Meza et al. | 714/6 |
| 6,760,324 B1 | 7/2004 | Scott et al. | |
| 6,765,492 B2 | 7/2004 | Harris | 340/686.6 |
| 6,769,063 B1 | 7/2004 | Kanda et al. | |
| 6,772,133 B1 | 8/2004 | Kambayashi et al. | |
| 6,775,782 B1 | 8/2004 | Buros et al. | |
| 6,778,820 B2 | 8/2004 | Tendler | 455/414.2 |
| 6,785,726 B1 | 8/2004 | Freeman et al. | |
| 6,795,941 B2 | 9/2004 | Nickels | |
| 6,816,842 B1 | 11/2004 | Singh et al. | |
| 6,826,606 B2 | 11/2004 | Freeman et al. | 709/223 |
| 6,842,896 B1 | 1/2005 | Redding et al. | |
| 6,850,958 B2 * | 2/2005 | Wakabayashi | 1/1 |
| 6,854,010 B1 * | 2/2005 | Christian et al. | 709/223 |
| 6,868,403 B1 | 3/2005 | Wiser et al. | |
| 6,876,984 B2 | 4/2005 | Tadayon et al. | |
| 6,883,095 B2 | 4/2005 | Sandu et al. | |
| 6,889,212 B1 | 5/2005 | Wang et al. | |
| 6,901,386 B1 | 5/2005 | Dedrick et al. | |
| 6,904,523 B2 | 6/2005 | Bialick et al. | |
| 6,920,567 B1 | 7/2005 | Doherty et al. | 726/22 |
| 6,928,166 B2 | 8/2005 | Yoshizawa | |
| 6,928,558 B1 | 8/2005 | Allahwerdi et al. | |
| 6,934,463 B2 | 8/2005 | Ishiguro et al. | |
| 6,934,848 B1 | 8/2005 | King et al. | |
| 6,941,283 B2 | 9/2005 | Kambayashi et al. | |
| 6,957,344 B1 | 10/2005 | Goldshlag et al. | |
| 6,959,291 B1 | 10/2005 | Armstrong et al. | |
| 6,961,858 B2 | 11/2005 | Fransdonk | |
| 6,968,384 B1 | 11/2005 | Redding et al. | |
| 6,973,444 B1 | 12/2005 | Blinn et al. | |
| 6,976,164 B1 | 12/2005 | King et al. | |
| 6,981,222 B2 | 12/2005 | Rush et al. | |
| 7,032,113 B2 | 4/2006 | Pendlebury | |
| 7,035,918 B1 | 4/2006 | Redding et al. | |
| 7,065,214 B2 | 6/2006 | Ishiguro et al. | |
| 7,069,468 B1 * | 6/2006 | Olson et al. | 714/7 |
| 7,073,063 B2 | 7/2006 | Peinado | |
| 7,085,382 B2 | 8/2006 | Terao et al. | |
| 7,096,469 B1 | 8/2006 | Kubala et al. | |
| 7,100,044 B2 | 8/2006 | Watanabe et al. | |
| 7,124,304 B2 | 10/2006 | Bel et al. | |
| 7,146,340 B1 | 12/2006 | Musson | |
| 7,149,806 B2 | 12/2006 | Perkins et al. | |
| 7,152,245 B2 | 12/2006 | Dublish et al. | |
| 7,171,662 B1 | 1/2007 | Misra et al. | |
| 7,185,195 B2 | 2/2007 | Hug et al. | |
| 7,206,936 B2 | 4/2007 | Aull et al. | |
| 7,225,333 B2 | 5/2007 | Peinado et al. | |
| 7,228,426 B2 | 6/2007 | Sinha et al. | |
| 7,302,703 B2 | 11/2007 | Burns | |
| 7,308,717 B2 | 12/2007 | Koved et al. | |
| 7,310,734 B2 | 12/2007 | Boate et al. | |
| 7,313,828 B2 | 12/2007 | Holopainen | |
| 7,318,236 B2 | 1/2008 | DeMello et al. | |
| 7,336,791 B2 | 2/2008 | Ishiguro | |
| 7,353,388 B1 | 4/2008 | Gilman | |
| 7,356,692 B2 | 4/2008 | Bialick et al. | |
| 7,382,881 B2 | 6/2008 | Uusitalo et al. | |
| 7,383,205 B1 | 6/2008 | Peinado et al. | |
| 7,415,729 B2 | 8/2008 | Ukeda et al. | |
| 7,545,931 B2 | 6/2009 | Dillaway | |
| 7,549,172 B2 | 6/2009 | Tokutani et al. | |
| 7,552,166 B2 | 6/2009 | Chack | |
| 7,716,348 B1 | 5/2010 | Redding et al. | |
| 7,747,851 B1 | 6/2010 | Robinson | |
| 7,814,023 B1 | 10/2010 | Rao | |
| 2001/0001268 A1 | 5/2001 | Menon et al. | |
| 2001/0013024 A1 | 8/2001 | Takahashi | |
| 2001/0034846 A1 | 10/2001 | Beery | |
| 2002/0001302 A1 | 1/2002 | Pickett | 370/352 |
| 2002/0010681 A1 | 1/2002 | Hillegass et al. | |
| 2002/0013722 A1 | 1/2002 | Kanaga | |
| 2002/0017977 A1 | 2/2002 | Wall | 340/5.28 |
| 2002/0038422 A1 | 3/2002 | Suwamoto et al. | |
| 2002/0052939 A1 | 5/2002 | Lee | |
| 2002/0083003 A1 | 6/2002 | Halliday | 705/52 |
| 2002/0087892 A1 | 7/2002 | Hideyo | |
| 2002/0107809 A1 | 8/2002 | Biddle et al. | |
| 2002/0112186 A1 | 8/2002 | Ford et al. | |

| | | | |
|---|---|---|---|
| 2002/0116340 A1 | 8/2002 | Hellberg et al. | |
| 2002/0125886 A1 | 9/2002 | Bates et al. | 324/307 |
| 2002/0138441 A1 | 9/2002 | Lopatic | |
| 2002/0154777 A1 | 10/2002 | Candelore | 380/258 |
| 2002/0164025 A1 | 11/2002 | Raiz et al. | 380/231 |
| 2002/0169625 A1 | 11/2002 | Yang et al. | |
| 2002/0169725 A1 | 11/2002 | Eng | |
| 2002/0174356 A1 | 11/2002 | Padole et al. | 713/200 |
| 2002/0176404 A1 | 11/2002 | Girard | 370/352 |
| 2002/0188656 A1 | 12/2002 | Patton et al. | |
| 2002/0188704 A1 | 12/2002 | Gold | |
| 2002/0194473 A1 | 12/2002 | Pope et al. | |
| 2003/0005427 A1 | 1/2003 | Herrero | 717/178 |
| 2003/0013411 A1 | 1/2003 | Uchiyama | |
| 2003/0018491 A1 | 1/2003 | Nakahara et al. | |
| 2003/0018582 A1 | 1/2003 | Yaacovi | |
| 2003/0023564 A1 | 1/2003 | Padhye et al. | |
| 2003/0055749 A1 | 3/2003 | Carmody et al. | |
| 2003/0084306 A1 | 5/2003 | Abburi et al. | |
| 2003/0095542 A1 | 5/2003 | Chang et al. | |
| 2003/0144959 A1 | 7/2003 | Makita | |
| 2003/0149670 A1 | 8/2003 | Cronce | |
| 2003/0149874 A1 | 8/2003 | Balfanz et al. | |
| 2003/0156719 A1 | 8/2003 | Cronce | |
| 2003/0159033 A1 | 8/2003 | Ishiguro | |
| 2003/0159070 A1 | 8/2003 | Mayer et al. | |
| 2003/0163428 A1 | 8/2003 | Schneck et al. | |
| 2003/0172035 A1 | 9/2003 | Cronce et al. | |
| 2003/0177393 A1 | 9/2003 | Ishiguro | |
| 2003/0191936 A1 | 10/2003 | Kawatsura et al. | |
| 2003/0208449 A1 | 11/2003 | Diao | |
| 2003/0233547 A1 | 12/2003 | Gaston et al. | |
| 2004/0003269 A1 | 1/2004 | Waxman et al. | |
| 2004/0010440 A1 | 1/2004 | Lenard et al. | |
| 2004/0010469 A1 | 1/2004 | Lenard et al. | |
| 2004/0010471 A1* | 1/2004 | Lenard et al. | 705/59 |
| 2004/0039916 A1 | 2/2004 | Aldis et al. | |
| 2004/0047354 A1 | 3/2004 | Slater et al. | |
| 2004/0073517 A1 | 4/2004 | Zunke et al. | 705/59 |
| 2004/0078339 A1 | 4/2004 | Goringe et al. | 705/59 |
| 2004/0088541 A1 | 5/2004 | Messerges et al. | |
| 2004/0103011 A1 | 5/2004 | Hatano et al. | |
| 2004/0103324 A1 | 5/2004 | Band | |
| 2004/0127196 A1 | 7/2004 | Dabbish et al. | |
| 2004/0128395 A1 | 7/2004 | Miyazaki | |
| 2004/0128551 A1 | 7/2004 | Walker et al. | 713/201 |
| 2004/0133794 A1 | 7/2004 | Kocher et al. | |
| 2004/0162998 A1 | 8/2004 | Tuomi et al. | |
| 2004/0166878 A1 | 8/2004 | Erskine et al. | 455/456.1 |
| 2004/0172367 A1 | 9/2004 | Chavez | 705/59 |
| 2004/0181695 A1 | 9/2004 | Walker | 713/202 |
| 2004/0181696 A1 | 9/2004 | Walker | 713/202 |
| 2004/0199760 A1* | 10/2004 | Mazza et al. | 713/150 |
| 2004/0249763 A1 | 12/2004 | Vardi | |
| 2004/0260589 A1 | 12/2004 | Varadarajan et al. | |
| 2004/0268120 A1 | 12/2004 | Mirtal et al. | |
| 2005/0005098 A1 | 1/2005 | Michaelis et al. | |
| 2005/0038753 A1 | 2/2005 | Yen et al. | |
| 2005/0076204 A1 | 4/2005 | Thornton et al. | |
| 2005/0086174 A1 | 4/2005 | Eng | |
| 2005/0091507 A1 | 4/2005 | Lee et al. | |
| 2005/0144437 A1 | 6/2005 | Ransom et al. | |
| 2005/0154877 A1 | 7/2005 | Trench | |
| 2005/0198510 A1 | 9/2005 | Robert et al. | |
| 2005/0202830 A1 | 9/2005 | Sudit | 455/456.1 |
| 2005/0229004 A1 | 10/2005 | Callaghan | |
| 2005/0246098 A1 | 11/2005 | Bergstrom et al. | 701/213 |
| 2005/0289072 A1 | 12/2005 | Sabharwal | |
| 2006/0021068 A1 | 1/2006 | Xu et al. | |
| 2006/0026105 A1 | 2/2006 | Endoh | |
| 2006/0036554 A1 | 2/2006 | Schrock et al. | |
| 2006/0036894 A1 | 2/2006 | Bauer et al. | |
| 2006/0064582 A1 | 3/2006 | Teal et al. | |
| 2006/0089912 A1 | 4/2006 | Spagna et al. | |
| 2006/0178953 A1 | 8/2006 | Aggarwal et al. | |
| 2006/0190409 A1 | 8/2006 | Hillegass et al. | |
| 2006/0242083 A1 | 10/2006 | Chavez | |
| 2006/0294010 A1 | 12/2006 | Kim et al. | |
| 2007/0033419 A1 | 2/2007 | Kocher et al. | |
| 2007/0094710 A1 | 4/2007 | Walker et al. | |
| 2007/0107067 A1 | 5/2007 | Fountian | |
| 2007/0219917 A1 | 9/2007 | Liu et al. | |
| 2008/0052295 A1 | 2/2008 | Walker et al. | |
| 2008/0082449 A1 | 4/2008 | Wilkinson et al. | |
| 2008/0141242 A1 | 6/2008 | Shapiro | |
| 2008/0189131 A1 | 8/2008 | Chavez | |
| 2010/0049725 A1 | 2/2010 | Walker et al. | |

FOREIGN PATENT DOCUMENTS

| | | |
|---|---|---|
| EP | 1562378 | 8/2005 |
| JP | 2006/085481 | 3/2006 |

OTHER PUBLICATIONS

U.S. Appl. No. 10/231,957, filed Aug. 30, 2002, Serkowski et al.
U.S. Appl. No. 10/232,507, filed Aug. 30, 2002, Serkowski et al.
U.S. Appl. No. 10/232,508, filed Aug. 30, 2002, Rhodes et al.
U.S. Appl. No. 10/232,906, filed Aug. 30, 2002, Walker et al.
U.S. Appl. No. 10/231,999, filed Aug. 30, 2002, Walker et al.
U.S. Appl. No. 10/811,412, filed Mar. 25, 2004, Walker.
U.S. Appl. No. 10/947,418, filed Sep. 21, 2004, Gilman et al.
ADTech Engineering, "IP Phone SI-160 User Manual (SCCP releases)," Version 1.2 (2002), pp. 1-20.
Articsoft Limited, "Public Key Infrastructure (PKI) FAQs" (Feb. 2, 2003), available at http://www.articsoft.com/wp_pki_faq.htm, 5 pages.
ARSYS, "Public Key Infrastructure," (Feb. 4, 2001), available at http://www.transactiontrust.com/technicaindex.html, 4 pages.
Clarke, Roger, "Centrelink Smart Card Technical Issues Starter Kit Chapter 7" (Apr. 8, 1998) at http://www.anu.edu.au/people/Roger.Clarke/DV/SCTISK.html, pp. 1-3.
Datakey, "Securing a Virtual Private Network with Smart Card Technology" available at www.datakey.com, pp. 1-8.
"Digital Cinema Key Management Messages," Draft 1 (Aug. 8, 2002), pp. 1-9.
Discerning the Times Digest and Newsbytes, "Global Control of All Buying and Selling Now Possible," vol. 1, Iss. 1 (Jan. 2000), available at http://www.discerningtoday.org/members/Digest/2000Digest/January/Global%20Control.htm, 2 pages.
Info Merchant Store. "VeriFone 2000, MS/DUKPT/STD Pin Pad, New" (printed Feb. 17, 2007), available at http://www.merchantamerica.com/creditcardterminals/index.php?ba=product_enlarge&product=9632, 1 page.
Griswold, Robert S., "Get Smart: The Coming Revolution of Smart Cards," *Journal of Property Management* (May/Jun. 1997), 5 pages.
Entrust Inc., "Entrust Authority Security Manager," (printed Aug. 13, 2004), available at http://www.entrust.com/authority/manager/index.htm, 23 pages.
Infosec Engineering, "Building a Corporate Public Key Infrastructure" (1999), available at http://www.infoseceng.com/corppki.htm, 20 pages.
LockStream Corporation, "Catalyst DRM Service Platform Architecture," Vers. 1.0 (Nov. 2003), pp. 1-28.
LockStream Corporation, "Catalyst DRM Service Platform" (printed Aug. 13, 2004), available at http://www.lockstream.com/products_spcm.php, 1 page.
LockStream Corporation, "Lockstream KeyDRM" (printed Aug. 13, 2004), available at http://www.lockstream.com/products_1gm.php, 2 pages.
LockStream Corporation, "Lockstream OMA 1.0 DRM Client" (printed Aug. 13, 2004), available at http://www.lockstream.com/products_sprm.php, 2 pages.
Microsoft Corporation, "Accessing a Smart Card" (Aug. 2002), available at http://msdn.microsoft.com/library/en-us/security/security/accessing_a_smart_card.asp, p. 1.
Microsoft Corporation, "Base Service Providers" (Aug. 2002), available at http://msdn.microsoft.com/library/en-us/security/security/base_service_providers.asp, p. 1.
Microsoft Corporation, "Building an ISO7816-4 APDU Command" (Aug. 2002), available at http://msdn.microsoft.com/library/en-us/security/security/building_an_Iso7816_4_apdu_command.asp, pp. 1-2.

Microsoft Corporation, "Introducing Smart Cards to the System" (Aug. 2002), available at http://msdn.microsoft.com/library/en-us/security/security/introducing_smart_cards_to_the_system.asp, p. 1.
Microsoft Corporation, "Primary Service Provider" (Aug. 2002), available at http://msdn.microsoft.com/library/en-us/security/security/primary_service_provider.asp, p. 1.
Microsoft Corporation, "Smart Card Authentication" (Aug. 2002), available at http://msdn.microsoft.com/library/en-us/security/security/smart_card_authentication.asp, pp. 1-2.
Microsoft Corporation, "Smart Card Interfaces" (Aug. 2002), available at http://msdn.microsoft.com/library/en-us/security/security/smart_card_interfaces.asp, p. 1.
Microsoft Corporation, "Smart Card Resource Manager" (Aug. 2002), available at http://msdn.microsoft.com/library/en-us/security/security/smart_card_resource_manager.asp, p. 1.
Microsoft Corporation, "Smart Card User Interface" (Aug. 2002), available at http://msdn.microsoft.com/library/en-us/security/security/smart_card_user_interface.asp, p. 1.
Microsoft Corporation, "Smart Card Service Providers" (Aug. 2002), available at http://msdn.microsoft.com/library/en-us/security/security/smart_card_service_providers.asp, p. 1.
Microsoft Corporation, "Vendor Wrapper Service Provider" (Aug. 2002), available at http://msdn.microsoft.com/library/en-us/security/security/vendor_wrapper_service_provider.asp, pp. 1-2.
MIT Laboratory for Computer Science, "The Cricket Indoor Location System," An NMS Project (printed Jul. 31, 2002), available at http://nms.lcs.mit.edu/projects/cricket/, 5 pages.
Motorola Press Release, "ERG Motorola Alliance Receives Award for Smart Card" (Jun. 6, 2000), available at http://www.motorola.com/LMPS/pressreleases/page888.htm, 3 pages.
NEC Infrontia Corporation Press Release, "Establishment of "SmartCardInfrontia" solutions for 'IC card',," (Mar. 13, 2002), 4 pages.
Novell®, "Certificate Server: Public Key Instrastructure," White Paper (1999), pp. 1-10.
SecurityConfig, Back Up Your Encrypting File System Private Key in Windows 2000 Download (Printed Aug. 13, 2004), available at http://www.securityconfig.com/software/alerts/back_up_your_encrypting_file_system_private_key_in_windows_2000.html, 2 pages.
Smart Card Alliance Industry News, "Cubic Introduces New Mobile Ticketing Machine" (Jul. 3, 2003), available at http://www.smartcardalliance.org/industry_news/industry_news_item.cfm?itemID=852, 2 pages.
Smart Card Alliance Industry News, "Cubic Corp. Introduces New National Security and Homeland Defense" (Sep. 9, 2002), available at http://www.smartcardalliance.org/industry_news/industry_news_item.cfm?itemID=310, 2 pages.
SSH Communications Security Corp., "Enabling Virtual Public Networks with Public Key Infrastructure," White Paper (Jan. 2004), pp. 1-9.
Streetman, Kibbee D. et al., "Public Key Infrastructure: Resources, Requirements and Recommendations," ATI IPT Special Report 00-06 (Apr. 2000), pp. 1-45.
Sun Developer Network, "Smart Card Overview," Sun Microsystems, Inc. (1994-2004), available at http://java.sun.com/products/javacard/smartcards.html, 2 pages.
NetLingo Dictionary of Internet Words, "Smart Card" (1995-0004), available at http://www.netlingo.com/lookup.cfm?term=smart+card, 2 pages.
Rankl, Wolfgang, "Smart Card Handbook," (Jun. 1, 2004), available at http://www.wrankl.de/SCH/SCH.html, 8 pages.
Russinovich, Mark, "Inside Encrypting File System, Part 1," *Windows & .NET Magazine* (Jun. 1999), available at http://www.winntmag.com/Articles/Index.cfm?ArticleID=5387 &Key=Internals, 4 pages.
Russinovich, Mark, "Inside Encrypting File System, Part 2," *Windows & .NET Magazine* (Jul. 1999), available at http://www.winntmag.com/Articles/Index.cfm?ArticleID=5592 &Key=Internals, 5 pages.
VeriFone Inc., "VeriFone Payment Solutions: Point-of-Sale PINpads" (1997-2004), available at http://www.verifone.com/products/printers_peripherals/html/pinpad_family.html, 1 page.
Whatis.com Target Search™, "PKI" (Jan. 13, 2004), available at http://whatis.techtarget.com/definition/0,289893,sid9_gci214299,00.html, 4 pages.
Datakey; "Securing a Virtual Private Network with Smart Card Technology"; Aug. 1, 2002; available at www.datakey.com; pp. 1-8.
U.S. Appl. No. 1/051,316, filed Feb. 4, 2005, Mazza.
Microsoft Software Piracy Protection "Product Activation Facts", at http://www.microsoft.com/piracy/activation_faq.mspx, Copyright 2005, 10 pages.
SIP.edu Cookbook, "SIP.edu and Avaya Converged Community Server", at http://mit.edu/sip/sip.edu/avaya.shtml, (Nov. 2004, Mar. 2005) 19 pages.
Avaya—"Product Support Notices (All Avaya Products): Product Support Notices", at http://support.avaya.com/japple/css/japple?temp.documentID=233413&temp.productID=1 . . . undated, 2 pages; 2005.
Avaya—"Voice over IP Monitoring" at http://www.avaya.com/gcm/master-usa/en-us/products/offers/integrated_mgt_voip_monoto . . . copyright 2005, 2 pages.
Sun Microsystems, Inc. Java Cryptography Architecture API Specification & Reference, Aug. 4, 2002, 56 pages.
MATLAB Installation Guide for PC, Release 11, The MathWorks Inc, 1999.
Microsoft Systems Management Server 2.0 Resource Guide, Microsoft Press, 1999. ISBN 0-7356-0583-1.
Garms et al., Windows NT Server 4, SAMS Publishing, 1998, ISBN 0-672-31249-2.
"Java Skyline: Java Servlet/Server Headline News," Oct. through Dec. 1998, pp. 1-3.
FLEXlm End Users Guide, Version 9.2., Jul. 2003, published by Macrovision, 166 pages.
Menezes et al., "Chapter 1: Overview of Cryptography," Handbook of Applied Cryptography, cr8523_01[1].pdf, 1997, CRC Press Llc, 48 pages.
Menezes et al., "Chapter 10: Identification and Identity Authentication," Handbook of Applied Cryptography, cr8523_1 0[1 ].pdf, 1997, CRC Press LLC, 40 pages.
Menezes et al., "Chapter 12: Key Establishment Protocols," Handbook of Applied Cryptography, cr8523_12[1].pdf, 1997, CRC Press LLC, 53 pages.
Bowman, Louise, "Smart Cards Go Corporate (Andrew Phillips from Dataquest forecasts the number of smart cards corporations will buy to increase to 91.9 mil by 2004 from a total of 230,000 in 2000)," Thomson Media, Oct. 2000, pp. 1-6.
Kuchinskas, Susan, "Keeping content safe is a big job and everyone has to do it: the security of its corporate content can make or break Topps (Topps employs security consultant to watch network traffic)," Online, Inc., Jul. 2003, pp. 1-5.
"Multos Fights On," Thomson Media, Inc., Jan. 2004, pp. 1-7.
"RightNow Technologies and MarketFirst Partnership Delivers Complete E-Marketing Solution," PR Newswire, Aug. 14, 2001, 2 pages.
White, Ron, How Computers Work, Millennium Edition, Que Publishing, 1999, front matter, back matter, and pp. 4-13,36-37,106-111, and 122-133.
Stevens, W. Richard, Advanced Programming in the UNIX Environment, Addison-Wesley, 1993, front matter, back matter, and pp. 18-21.
Background of the Invention for the above-captioned patent application (previously provided).
US 5,742,747, 04/1998, Hamadani et al. (withdrawn)

\* cited by examiner

SOFTWARE LICENSING FOR SPARE PROCESSORS

FIELD OF THE INVENTION

The present invention relates generally to the licensing of computational components and specifically to the licensing of spare computational components.

BACKGROUND OF THE INVENTION

To provide high levels of reliability and availability, it is common to provide spare or redundant computational components. FIG. 6 depicts a conventional main and spare processor architecture in a distributed telecommunications network. Telecommunications switch or server 600 comprises main processor 604 and duplicated processor 608. Duplicated processor 608 can provide the same services as main processor 604 in the event that the main processor 604 malfunctions. To provide additional tiers of redundancy, a plurality of spare processors 612a-n are provided at different locations in the network. The various layers of redundancy provide fault tolerance and high availability, which is particularly important in telephony applications. When a spare processor detects that the primary and duplicated processors are no longer in control of the network (due for example to a failure of the main/duplicated processor or a loss of network connectivity to the server/switch 600), the spare processor assumes control for its assigned portion of the network. The spare processor typically is configured to run the same software and therefore provide the same functionality as the main and duplicated processors. As a result the customer is able to maintain the functionality of its telecommunications system via the spare processor when the main processor is not available.

In telecommunication applications, spare processors can be configured in many different ways. In one configuration, the spare processors 612a-n are referred as Survivable Remote Processors or SRPs, and each serves a corresponding port network (not shown). If the corresponding connection 616a-n to the switch/server 600 goes down (causing a loss of network connectivity) and/or if the main and duplicated processors fail (and the link to the corresponding port network or the expansion interface comes up), each of the survivable remote processors 612a-n is activated and serves its corresponding port network. In another configuration, the spare processors 612a-n are referred to as Local Spare Processors or LSPs, and each serves a corresponding packet-switched media gateway (not shown). If the LSP is contacted by a network node, such as a telephone or media gateway processor, that is preinstructed to use or register with the LSP in the event of malfunctions of the main and duplicated processors, the LSP is activated and serves the network nodes contained in its preassigned network region. In yet another configuration, the spare processors 612a-n are referred to as Wide Area Network Spare Processors or WSPs, and each WSP is configured to operate the entire network and not just a portion of the network as in the case of the SRP and LSP. To avoid conflicts, the WSPs are arranged in a hierarchy such that each WSP is only activated in the event that the main and duplicated processor and the WSP(s) higher in the hierarchy (if any) are not operational. A WSP periodically polls the main and/or duplicated processors and WSP(s) higher in the hierarchy and, if a response is not received within a configurable time period, the WSP concludes that the corresponding polled processor is not operational.

The use of SRPs, LSPs, and/or WSPs can cause difficulties in providing right-to-use protection and software copy protection. Typically, spare processors are sold at a significant discount relative to main processors. The rationale is that the software on the spare processor is used less and should therefore cost less than the main processor's software. This presents an opportunity for customers to deprive the software supplier of revenue by buying the spare processor software and using it as the main processor software.

Existing licensing approaches do not address this problem. In one telecommunications licensing approach for example, a valid license file is required to run a computational component. This approach is discussed in detail in copending U.S. patent application entitled "Securing Feature Activation in a Telecommunication System", Ser. No. 09/357,679, filed Jul. 20, 1999, to Serkowski, which is incorporated herein by this reference. In such licensing verification systems, the license file contains a serial number that must be present on the processor that is to execute the licensed software for the license to be valid and the software to be executable. In telecommunication applications, the serial number of the main processor 604 must be in the license file for the processor 604 to run the licensed software.

The license file also contains a software name and/or version of the licensed telecommunication application and licensed features. The data structures corresponding to the features are of two types. In a type 1 feature, the data structures reflected enablement or disablement of the corresponding feature using a simple on/off state. Examples of features falling into this category include abbreviated dialing enhanced list, audible message waiting, vectoring, answer supervision by call classifier, ATM trunking, agent states, dial by name, DCS call coverage, echo cancellation, multifrequency signaling, and wideband switching. In a type 2 feature, the data structures include a single numeric value and/or a name kind of entry. Examples of features falling into this category include logged-in agents, offer category, maximum numbers of concurrently registered IP stations, administered IP trunks, ports, and concurrently administered remote office stations/trunks, and call center release.

This licensing scheme is not configured for licensing spare processors such that they cannot be permanently used as main processors. To provide the desired reliability and availability of redundant systems, not only the main but also the spare processors must be able to be enabled by the licensing verification system. However, if a license is provided for a spare processor, there is nothing to prevent the spare processor from being used as a main processor on a permanent basis.

SUMMARY OF THE INVENTION

These and other needs are addressed by the various embodiments and configurations of the present invention. The present invention provides a method and system that uses a backup flag and or license timer to enable selectively a backup computational system or functional part thereof in the event that the primary computational system is not able to operate effectively.

In one embodiment, a method for protecting actuation of a computational component is provided. The method includes the steps of:

(a) receiving an indication that the primary computational component is no longer in the operational mode or has lost its network connection to some or all of the system it is controlling;

(b) reading a license timer associated with the backup computational component, (c) when the value of the license error timer is not a first value (e.g., a selected value such as zero or a selected range of values), permitting the backup computational component to change to the operational mode and (d) when the value of the license error timer is the first value or a value in a range of values, not permitting the backup computational component to change to the operational mode.

The primary and backup computational components can be any entity capable of performing a task or executing instructions, e.g., a logic-containing board or chip such as an application specific integrated circuit or ASIC, a (control) processor, software, etc. In one configuration, the computational components are duplicates of one another. For example, the computational components can be two processors one of which is a standby processor and the other of which is an active processor.

The license error timer can be implemented in any suitable manner, such as a countdown or countup timer. In either implementation, the first value can be a single value or a range of values. In one configuration, the timer value is saved in non-volatile memory that is preserved across system resets so the customer cannot reset the timer and return the backup computational component to service by performing resets. In this manner, the customer can use the backup computational component in the operational mode for only a predetermined and manufacturer configurable time period.

What is required for a computational component to be in the operational mode depends upon the particular application. Generally, the computational component is in the operational mode until the computational component experiences at least a predetermined degree of operational impairment. The impairment can be caused by the malfunction of the computational component itself or hardware or software associated with the computational component, such as a loss of network connectivity, a circuit malfunction, or software being corrupted.

Commonly, the backup computational component is in a standby mode while the primary computational component is in the operational mode. In the standby mode, the backup computational component generally is subservient to the main processor and/or provides, at most, only minimal and/or ancillary processing to the network.

License modes can be used to control the operations of the primary and backup computational components. In one configuration, the primary and backup computational components are each set to a first or license-normal mode when a number of license checks are successfully verified. The computational components are set to a second or license-error mode when certain license checks are unsuccessfully verified and time remains on the license timer. The components are set to a third or no-license mode when certain license checks are unsuccessfully verified and/or no time remains on the license timer. Typically, the backup computational component is only in the first license mode when it is also in the standby mode. The backup computational component is set to the second or third license mode when it is no longer in the standby mode. The backup computational component is reset to the first license mode when it is able to contact the primary computational component and relinquish control of the system to the primary computational component and again enter the standby mode.

The backup computational component can have a license file stored in a separate location from the license file of the primary computational component. The license file typically includes at least one unique identifier associated with the backup computational component, a backup flag, a platform type, a platform identifier and a plurality of application definitions. Each application definition corresponds to one of a plurality of applications and comprises release information, license expiration information, and one or more types of feature keyword information.

As will be appreciated, the relationship between the actuated computational component and identifier in the license file can take many forms. In one configuration, the computational component is software, and the identifier is associated with a hardware component configured to execute the software. For example, the primary backup and computational components are control processors and steps (c) and (d) determine whether another computational component, namely a software application, will be executed by the backup computational component. In this configuration, the software itself is not directly assigned a unique identifier. For example, the identifier is a serial number(s) assigned to or associated with the control processor(s) configured to execute the software. In another example, the identifier is a serial number(s) assigned to a hardware component other than the executing control processor, such as a serial number of a media gateway processor where the control processor resides or a serial number of an IP services interface card in a port network. Alternatively, the identifier can be assigned directly to the actuated computational component itself.

The unique computational component identifier can be one or more numeric, alphabetical, or alphanumeric symbols. The identifier can have any format and have any length. For example, the identifier can be a serial number assigned by a manufacturer, a Medium Access Control or MAC address, and the like.

The backup flag can indicate not only the backup state of a computational component but also the type of backup function provided by the associated computational component. For example, the backup flag can be implemented as multiple flags, such as an SRP flag indicating that the associated component is configured as an SRP, as an LSP flag indicating that the associated component is configured as an LSP, and as a WSP flag indicating that the associated component is configured as a WSP.

The method and system of the present invention can have a number of advantages. First, the present invention can effectively protect and control right to use of one or more redundant computational features, applications, and any other type or form of redundant computational component, without compromising the reliability and availability of the redundant computational component. The present invention therefore permits the sale of spare processors at less cost than the main processor. The use of a license file containing fields for multiple serial numbers can provide a high level of security of copy protection and feature activation. The license file marries the use of software to a specific instance of hardware. In this manner, the ability to create two simplex systems out of a single, redundant system is substantially impeded. Second when the licensing file is used to operate all or part of the network, the present invention provides a safeguard to prevent the spare processor from being used too long as the main processor. The grace period provided to the user is a configurable parameter and is flexible for a variety of applications. Third, the present invention can allow rapid, simple, and convenient generation of licenses for new systems and regeneration of licenses to accommodate repair situations. Fourth, the present invention can eliminate the ability of a service technician, or other authorized or unauthorized personnel, to alter directly the feature mix of a switch. That is, fewer people have the knowledge or access to "give away" software or features. Fifth, customers, dealers, and distributors can activate the primary and backup computational components or features themselves without service personnel involvement.

Sixth, the present invention can perform license verification rapidly, automatically and seamlessly for the user. These and other advantages will be apparent from the disclosure of the invention(s) contained herein.

The present application is related to U.S. patent application Ser. Nos. 10/232,906, now U.S. Pat. No. 7,681,245, entitled "REMOTE FEATURE ACTIVATOR FEATURE EXTRACTION" to Walker et al.; 10/232,508, now U.S. Pat. No. 7,698,225, entitled "LICENSE MODES IN CALL PROCESSING" Rhodes et al.; 10/232,507, now U.S. Pat. No. 7,228,567, entitled "LICENSE FILE SERIAL NUMBER TRACKING" to Serkowski et al.; 10/231,999, now U.S. Pat. No. 7,707,116, entitled "FLEXIBLE LICENSE FILE FEATURE CONTROLS" to Walker et al.; and 10/231,957, now U.S. Pat. No. 7,216,363, entitled "LICENSING DUPLICATED SYSTEMS" to Serkowski et al., each of which is filed concurrently herewith and is incorporated herein by reference.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
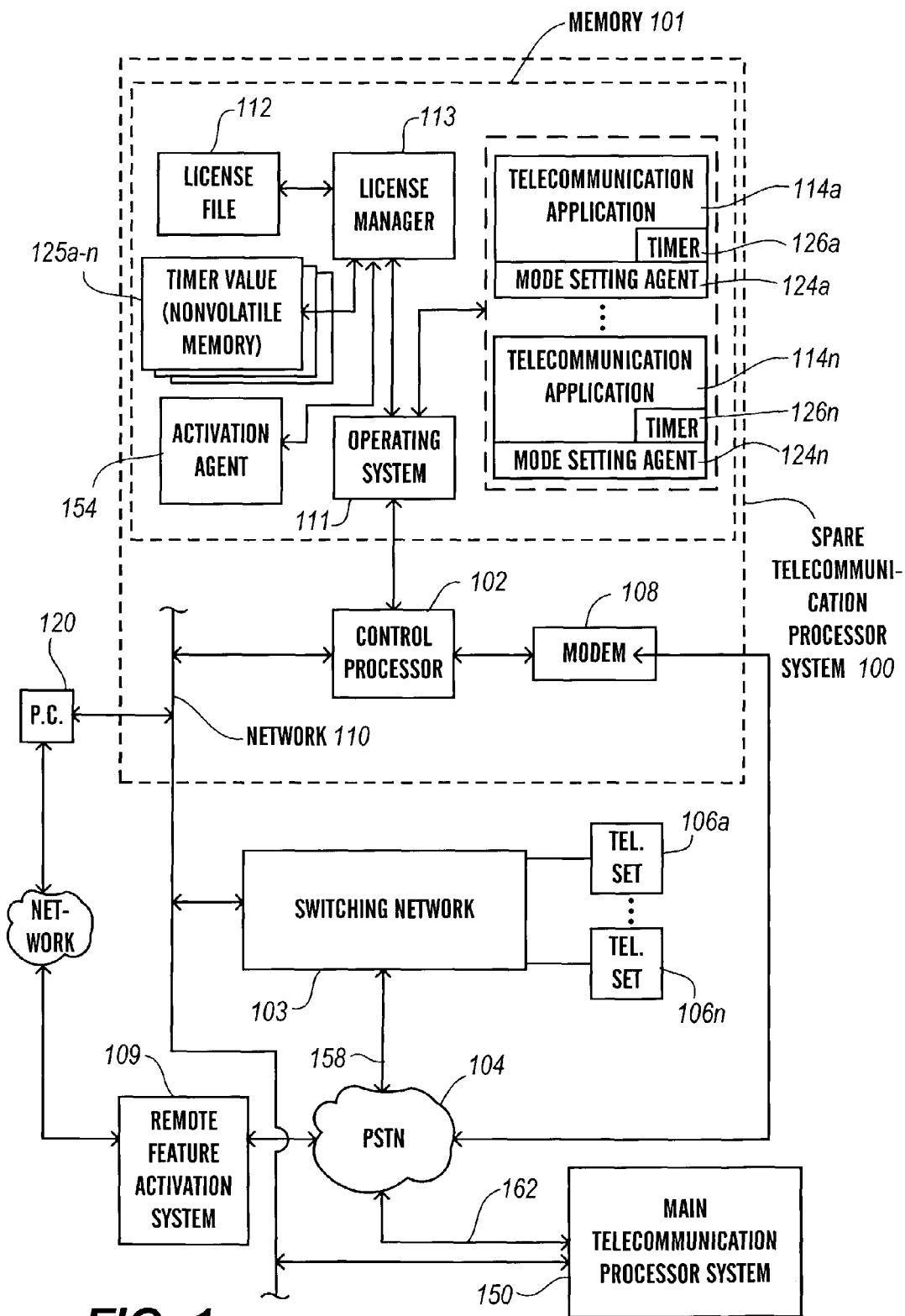
FIG. 1 depicts a redundant telecommunication switching system according to an embodiment of the present invention.

FIG. 1 illustrates a spare telecommunications processor system 100 interconnected to a main telecommunications processor system 150 via network 110. The system 100 can be used as a SRP, LSP, and/or WSP. Spare telecommunications processor system 100 controls switching network 103 and telephone sets 106 when the main telecommunications processor system 150 is unable to provide this function. The features and operations provided by telecommunication processor system 100 to switching network 103 and telephones 106a-n and its interactions with public telephone network 104 are well known in the art. Illustratively, the switching system of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference, or Avaya Inc.'s DEFINITY™ private-branch exchange (PBX)-based ACD system.

The spare control processor 102 executes telecommunication applications 114a-n (each of which comprises a mode setting agent 124 and a timer 126) via operating system 111 to perform the telecommunication functions and features. Spare processor 102 executes instructions in memory 101, such as license manager 113, activation agent 154, and telecommunication application 114a-n, and communicates with switching network 103 via network (e.g. LAN or WAN) 110. One skilled in the art can readily envision that the spare control processor 102 can communicate with switching network 103 via a direct connection such as a connection via the processor bus of control processor 102.

Operating system 111 is a conventional operating system allowing for the execution of applications such as telecommunication application 114a-n and for the intra-application communication of messages. Telecommunication application can be any application(s) and/or feature(s) used in telecommunication systems, such as DEFINITY™ by Avaya, Inc.

Personal computer (PC) 120 is utilized by service personnel to administer the telecommunication switching system.

Switching (or server) network 103 provides all of the necessary telecommunication switching and interfacing that is required in the telecommunication switching system.

Activation agent 154 monitors, by known techniques, the telecommunications network and determines when to activate the spare processor 102. For an SRP, the activation agent 154 monitors connection 158 and 162 (which is typically a fiber optic cable) to the main telecommunication processor system 150 and, when the connection goes down (causing a loss of network connectivity) and/or if the system 150 fails, the activation agent 154 causes activation of the SRP. For an LSP, the agent 154 causes activation of the LSP when the LSP is contacted by a network node, such as a telephone 106, that is pre-instructed to use the LSP in the event of malfunctions of the main processor system 150. For a WSP, the agent 154 causes activation of the WSP when the main processor system 150 and WSP(s) higher in the heirarchy no longer respond to polling messages from the WSP.

License manager 113 periodically verifies that the spare telecommunication processor system 100 is being operated in accordance with pertinent licensing rules and disables the system 100 or an operational part of the system 100 when licensing rules are violated (or a predetermined licensing event occurs). During initialization of the switch software, during the restoration of translations, and periodically as the switch is running, a query is made by the telecommunication application to the license manager 113. The license manager 113 reads license file 112, compares the serial number(s) in the license file 112 with a serial number in the switch hardware, compares the software name and/or version in the license with the name and/or version of the telecommunication application 114a-n or operational part thereof, and, if a match occurs, delivers permission to run the telecommunication application 114a-n or operational part thereof with the feature mask in the license file. The feature mask controls revenue associated options.

Figure 2:
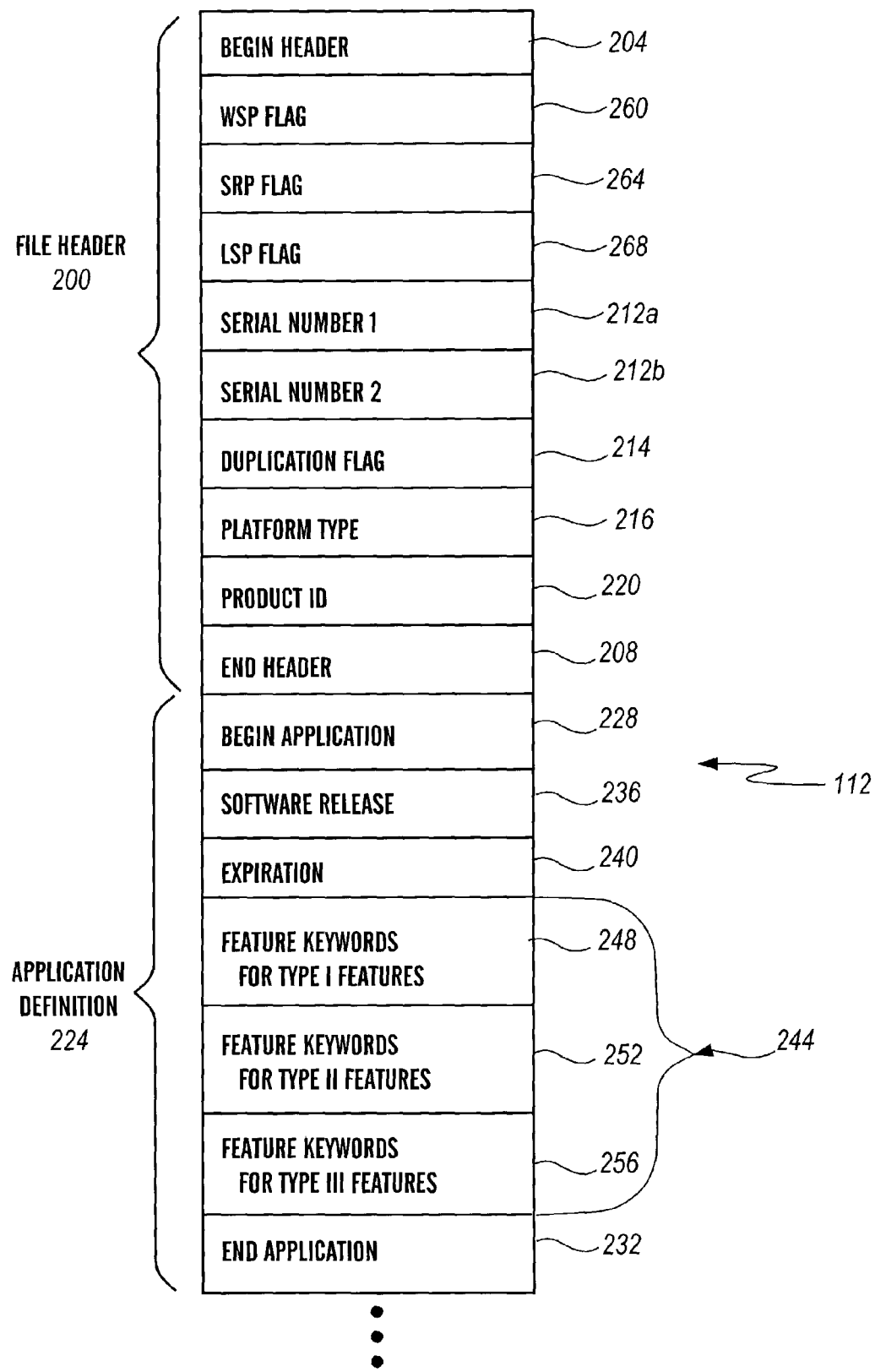
FIG. 2 depicts a license file according to another embodiment of the present invention.

Referring to FIGS. 1 and 2, the license file 112 includes a file header 200 which includes header beginning and ending fields 204 and 208 respectively, serial number fields 212a and b (one of which contains a serial number associated with spare control processor 102 and the other of which a serial number associated with a duplicated spare control processor (not shown)), duplication flag field 214 (containing an indicator whether there is a duplicated control processor (or two serial numbers) in the system 100, e.g., a simplex or duplex configuration), WSP flag field 260 (indicating whether or not the associated spare processor(s) is acting as a WSP), LSP flag field 268 (indicating whether or not the associated spare processor(s) is acting as a LSP), SRP flag field 264 (indicating whether or not the associated spare processor(s) is acting as a SRP), a platform type field 216 (containing first platform information such as the product type and name and/or version of product that the license is for), and a product identifier or PID field 220 (containing second platform information different from the first platform information such as a product identifier used at the platform level for accessing Access Security Gateway or ASG keys) and one or more application definitions 224 each of which includes application beginning (which names the application, e.g., "DEFINITY"™ by Avaya, Inc.) and ending fields 228 and 232, respectively, a software release field 236 (identifying the software release version for which the license is granted), and an expiration field 240 (expiration date of the license), and a feature mask 244 (providing information relating to the features to be enabled). The software application name is defined in the "Begin Application" field 228. In some applications, the duplication flag, WSP, LSP, and/or SRP fields are contained in each application definition 224 and not in the file header 200. As will be appreciated, there is no duplicated spare control processor in most applications; therefore, the duplication flag is generally not set.

In one configuration, the feature mask is configured as a feature mask data format, though any data format can be used. This configuration is discussed in detail in copending U.S. patent application Ser. No. 10/231,999, now U.S. Pat. No. 7,707,116, entitled "Flexible License File Feature Controls" to Walker et al. The content of the mask controls what features are enabled or may be enabled on the product. There are three types of entries corresponding to fields 248, 252, and 256 in the feature mask.

The first type of entry (or Type I feature) in field 248 relates to those types of features that have a simple on/off state. The feature is either enabled or disabled. Each of these types of entries has two variables associated with it, namely a value and a lock. The value variable can be either on or off and the lock variable either locked or unlocked. Examples of features falling into this category include (in addition to those Type I features identified above in the background) Digital Communication System or DCS call coverage, audible message waiting, vectoring, attendant vectoring, Asynchronous Transfer Mode or ATM, dial by name, echo cancellation, multimedia call handling, multiple call handling, caller identification, multifrequency signaling, Integrated Services Digital Network or ISDN network call redirection, centralized attendant, remote office, enhanced Direct Inward dialing or DID routing, survivable remote processor, time of day routing, tenant partitioning, hospitality announcements, Vector Directory Number or VDN of origin announcement, wideband switching, and wireless.

The second type of entry (or Type II feature) in field 256 relates to those types of features that have a numeric value. The value can correspond to a numeric value and/or name kind of entry. Each of these types of entries has two values associated with it, namely a lower limit value and an upper limit value. The lower limit value is never greater than the upper limit value. Examples of features falling into this category include (in addition to those Type II features identified above in the background) logged-in automated call distribution or ACD agents, maximum currently registered IP stations, maximum administered IP trunks, offer category, maximum number of ports, maximum number of administered remote office trunks, and maximum number of mobile stations.

The third type of entry (or Type III feature) in field 256 relates to those types of features that have a product value (e.g., corresponding to a product name or type), a release number (e.g., referring to a product release identifier), and a numeric value (e.g., indicating an operational parameter associated with the product and/or release, such as how many ports are licensed, and/or how many licenses for the product are granted. This type of feature allows other controlled applications to be executed. Like the second type of entry, each of these types of entries has two values associated with it, namely a lower limit value and an upper limit value. The lower limit value is never greater than the upper limit value. A feature limit in the feature mask is such a capacity value associated with a Type II or III feature.

Referring again to FIG. 1, a remote feature activation system 109 generates the license file that is transmitted to the spare telecommunications processor system 100 upon installation or provisioning of the system. Remote feature activation system 109 is discussed in detail in copending U.S. patent application Ser. No. 10/232,507, now U.S. Pat. No. 7,228,567, entitled "License File Serial Number Tracking", to Serkowski et al. Alternatively, the license file is installed by authorized personnel via PC 120.

Modem 108 is directly connected to control processor 102 so that control processor(s) 102 can contact remote feature activation system 109 via public telephone network 104. Similarly, remote feature activation system 109 can establish a communication channel with control processor 102 via public telephone network 104 and modem 108. One skilled in the art can readily envision that modem 108 can be interconnected to control processor(s) 102 via LAN 110.

Each telecommunication application 114*a-n* can include a corresponding mode setting agent 124*a-n* to set the licensing mode of the system 100. As discussed in copending U.S. application Ser. No. 10/232,508, now U.S. Pat. No. 7,698,225, entitled "Licensed Modes in Call Processing", to Rhodes et al., the mode setting agent 124 can set one of three operational modes to the system 100.

In the LICENSE NORMAL mode, the license manager has found that a valid license is properly installed, the license file contains a serial number that matches the serial number of the processor (simplex configuration) or a plurality of serial numbers that match the serial numbers of a similar plurality of processors (multiple processor configuration (e.g., duplex configuration)), the software name and version of the telecommunication application matches that in the license file, the license has not expired, the offer category in the feature mask matches the translation, the feature usage in translation does not exceed limits in the feature mask (e.g., a feature limit is a capacity value associated with a type 2 or type 3 feature), and if the processor is a WSP, SRP, or LSP, the processor is not active.

In the LICENSE ERROR mode, the license manager has found one or more of the following: no valid license is properly installed, the license file contains a serial number that does not match the serial number of the processor (simplex configuration) or a plurality of serial numbers that do not match the serial numbers of a similar plurality of processors (multiple processor configuration (e.g., duplex configuration)), the license has expired, the feature usage exceeds limits (e.g., there are more ports translated than permitted by the port limit in the license file which can occur when translations are copied from another switch or when a new license file is installed that has lower limits than the previous license file) and the processor is a WSP, SRP, or LSP that is active (or has been activated by activation agent 154). As discussed in copending U.S. patent application Ser. No. 10/231,999, now U.S. Pat. No. 7,707,116, entitled "Flexible License File Feature Controls", to Walker et al., if there is a mismatch between the existing translation and the license file for a locked first type of entry the feature on/off state is simply updated to match the license and does not cause entry into LICENSE-ERROR mode. The LICENSE-ERROR mode is cleared by correcting the error that caused entry into the mode or by installing a valid license that is consistent with the configuration of the system 100. In the LICENSE-ERROR mode, the telecommunication application is permitted to run for a predetermined period of time or grace period. License error timers 126a-n (FIG. 1) and corresponding license timer values 125a-n are used for each application to monitor the grace period.

In one configuration, all call processing functions of the telecommunication application are permitted to run during the LICENSE-ERROR MODE. Thus, the customer will realize the same level of service in both the LICENSE-NORMAL and LICENSE-ERROR modes.

In the NO-LICENSE mode, the license manager has found that (i) a corresponding license error timer 126a-n expired and one or more of the following: there is no valid license installed on the system, the feature usage exceeds limits, the license file contains a serial number that does not match the serial number of the processor (simplex configuration) or a plurality of serial numbers that do not match the serial numbers of a similar plurality of processors (multiple processor configuration (e.g., duplex configuration)), the license is expired, and the processor is a WSP, SRP, or LSP that is active; (ii) the name and/or version of the telecommunication application does not match the name and/or version in the license file; and/or (iii) the offer category in the feature mask does not match translation. In the NO-LICENSE mode, all new call originations (except alarm calls (e.g., 911 calls) and calls to an administered emergency number) are denied and all incoming calls (except calls to an administered number) are denied. This mode is cleared by correcting the error that caused entry into the mode or by installing a valid license that is consistent with the configuration of the switch.

The system configuration of FIG. 1 has both an active (main) processor system 150 and spare processor system 100. Each of the processor systems has a license file identifying the application(s), software version(s), serial number(s), feature settings and other relevant information for the system (reference FIG. 2). The spare processor feature is set to "locked on" in the license feature mask for the spare processor system 100 in order to ensure that the spare processor system is used as a spare and not as a main processor system.

When in standby mode, the spare processor is in LICENSE-NORMAL mode. A spare processor cannot be in LICENSE-NORMAL mode unless it is in the standby mode. License checks in standby/LICENSE-NORMAL mode are necessary because, when a spare processor becomes active, it enters LICENSE-ERROR mode automatically, merely by virtue of the fact that it is active. Without license checks in standby mode, it would be possible for a user to purchase spare processor software once and sell it many times to different customers with no loss of functionality. Moreover, these checks are necessary to ensure that the spare processor is able (from a licensing perspective) to assume control of its preassigned portion of the network. If a license error timer value is zero when the activation agent causes activation of the spare processor, the spare processor enters the NO-LICENSE mode. A spare processor returns to LICENSE-NORMAL mode only when it returns to standby mode, which requires reinitialization. If within a configurable time (typically 30 minutes) after rebooting, the spare processor is activated by the activation agent, the spare processor shall immediately enter LICENSE-ERROR mode. The respective license timer 126a-n for each application is not reset and will retain the value before rebooting as saved in corresponding timer value 125a-n in nonvolatile memory. If the spare processor continues to be active for more than a configurable period of time (typically six days), the license timer 126a-n for each application will expire and the spare processor will enter NO-LICENSE mode.

The operation of the license manager 113 and mode setting agent 124 will now be discussed in more detail with reference to FIGS. 3 and 4. The process begins in step 300 of FIG. 3 when the mode setting agent 124 sends, such as at initialization of the application, periodically when the spare processor is in standby and active modes, or when a new license is installed, an encrypted message to the license manager 113 via operating system 111. The encrypted message includes a request for permission to run, a request for a list of permitted features, the name and version number for the telecommunication application 114 (making the request), and the date and time of the request. The request may also include a request for the appropriate timer value 125a-n saved in nonvolatile memory.

Figure 4A:
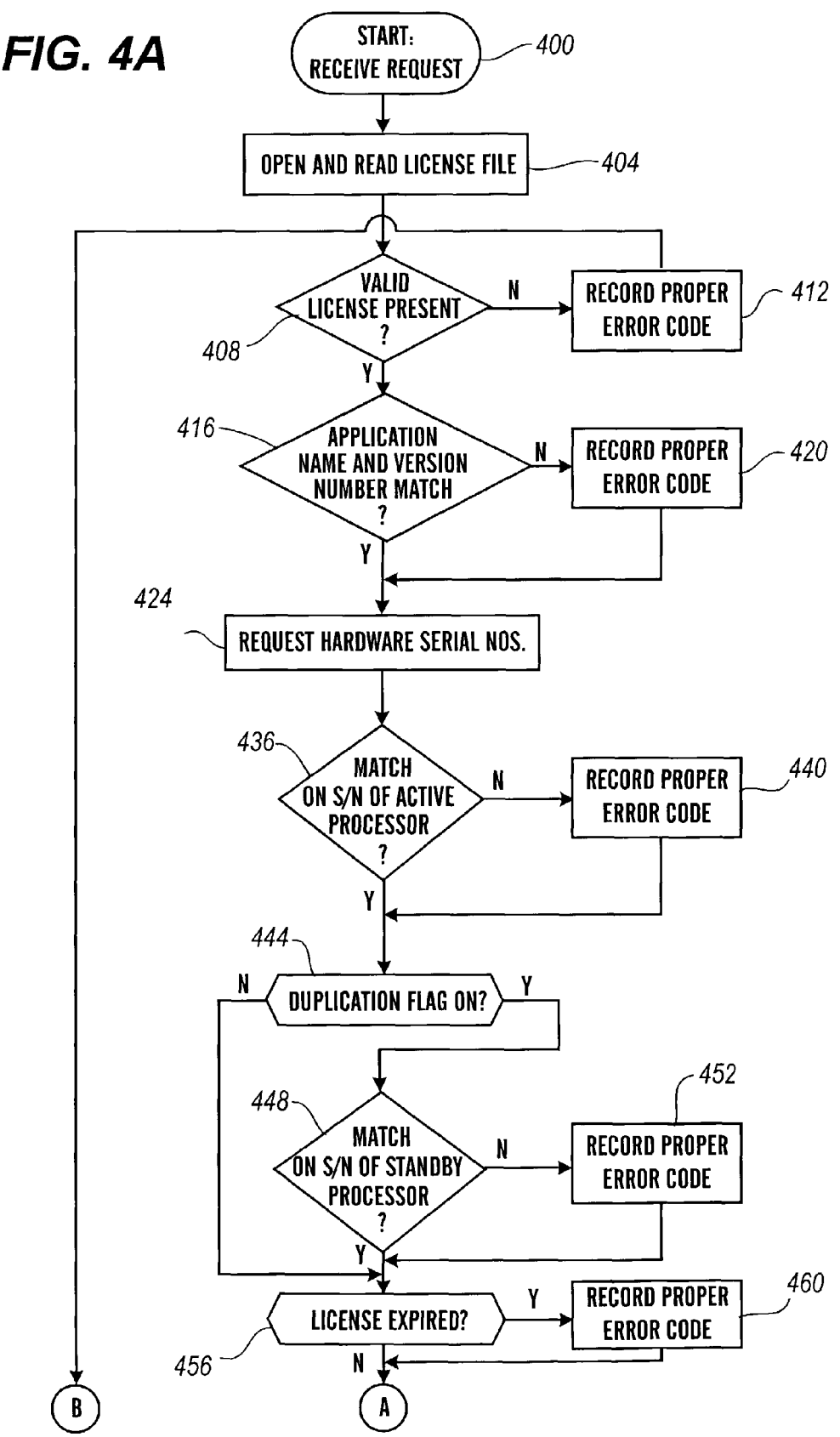
FIGS. 4A and 4B are flow charts depicting an algorithm of the license manager according to a further embodiment of the present invention.

The request is received by the license manager 113 in step 400 of FIG. 4A. The license manager 113 decrypts the request and in response to the encrypted message attempts to open, decrypt, and read the license file 112 in step 404. In step 408, the license manager determines whether or not the license file is present and valid. This query determines whether there is a license file available, whether the license file is readable, and whether the license file is in the proper format. If any one of these checks has a negative result, the manager 113 concludes that the license file is invalid. When the license file is invalid, the manager 113 records in step 412 the error code corresponding to the fact of and/or reason for license file invalidity and proceeds to step 472 (discussed below).

In step 416, the manager 113 reads license file 112 to obtain the name and/or version number of telecommunication application 114. For security reasons, the license file is stored in an encrypted form. As will be appreciated, the encryption can be performed using one or more keys. The manager 113 then determines whether or not the name and/or version number for the telecommunication application 114 matches the name and/or version number in the decrypted license file. If not, the manager 113 in step 420 records the error code corresponding to an unmatched name and/or version number.

In step 424, the manager 113 forwards a serial number request to the processor 102 (and duplicated control processor if present). Control processor 102 is assigned a unique electronically readable serial number that is set during board manufacture. If the processor 102 fails to respond to the serial number request after a predetermined time period and/or after a predetermined number of requests, manager 113 assumes that the processor 102 is unavailable. It is typically desired to resend serial number requests in the event that no response is received, as the processor may be resetting (e.g., after a firmware update) at the time of the initial serial number request.

In step 436, the manager 113 determines if the serial number of the active processor could be read and if it matches serial number 212a or 212b (if present) in the license file. If the serial number of the processor could not be read in step 428, or if it does not match any of the serial numbers in the license file, the manager 113 in step 440 records the proper error code for an unmatched serial number.

In step 444, the manager 113 determines whether the duplication flag is set or not. The duplication flag may be configured in any suitable manner, such as a bit having two values, 0 and 1, each of which indicates a different predetermined duplication state. For example, a "0" value indicates no duplication and a "1" value duplication. When the duplication flag is on, the manager 113 proceeds to step 448 and checks whether the duplicated spare control processor serial number could be read in step 424 and if the serial number of the duplicated spare control processor 102b matches either of the serial numbers in the license file. When the duplication flag is on, and the duplicated spare control processor serial number could not be read or it does not match either of the serial numbers in the license file, the manager 113 in step 452 records the proper error code for an unmatched duplicated spare control processor serial number.

In the event that the duplication flag is off or after either of steps 448 or 452, the manager 113 determines in step 456 whether or not the license is expired. When the expiration date in the license file is earlier than the current date and time, the license is considered to be expired. When the license is expired, the manager 113 in step 460 records the proper error code for an expired license.

In step 464, the manager 113 decides whether the license is to be denied or granted. The license is denied when one or more error codes is recorded during the preceding steps. The license is granted when no error codes are recorded.

When the license is granted, the manager 113 generates a license granted response in step 468. The response includes an indication that the license is granted and the feature mask of the license file. The message is encrypted and forwarded to the mode setting agent 124.

When the license is denied, the manager 113 generates a license denied response in step 472. The response includes an indication that the license is denied, the error code(s) corresponding to the reason(s) for license denial, and the feature mask. The feature mask is not returned if the error is "no valid license present" since there is no feature mask to return without a valid license. When the license is denied for more than one reason, error codes for all of the reasons for license denial are included in the license denial response. The message is encrypted and forwarded to the mode setting agent 124.

Referring again to FIG. 3, the mode setting agent 124 in step 304 receives the encrypted license response from the manager 113 and decrypts the response. As discussed below, the mode setting agent 124 parses through the various fields of the license response to set the license mode.

In step 308, the agent 124 determines whether the manager 113 found a valid license to be present. If a valid license is not present, the agent 124 determines in step 312 whether the current license mode of the system 100 is the NO-LICENSE mode. When the current mode is not the NO-LICENSE mode, the agent sets the mode to the LICENSE-ERROR mode in step 316 (this prevents a system with a valid license from immediately going from LICENSE-NORMAL mode to NO-LICENSE mode if the license file is corrupted or inadvertently deleted). When the current mode is the NO-LICENSE mode, the agent leaves the system in the NO-LICENSE mode in step 320. If a valid license is present, the agent 124 proceeds to step 324.

In step 324, the agent determines whether the manager found that the application name and/or version matched the name and/or version in the license file. If not, the agent proceeds to step 320 in which the mode is set to the NO-LICENSE mode. If so, the agent proceeds to step 328.

In step 328, the agent determines whether the manager found that the offer category matches the translation. If not, the agent proceeds to step 320 in which the mode is set to the NO-LICENSE mode. If so, the agent proceeds to step 332.

In step 332, the agent determines whether the value of the license error timer 124 is greater than zero. The application 114 maintains the license error timer value in memory. When the license timer value is zero, the agent proceeds to step 336 (discussed below), and when the license timer value is greater than zero the agent proceeds to step 340 (also discussed below).

In one configuration, the value of the license error timer is periodically saved in nonvolatile memory of each of the processors so that the timer can be preserved across system resets. To make this possible, the mode setting agent makes not only a license file request but also a timer save request at predetermined intervals. The license timer value passed to the manager 113 for storage is set as follows: (a) if the system 100 is in LICENSE-NORMAL mode, the license timer value shall be the full duration of the grace period, e.g., 6 days, (b) if the system 100 is in LICENSE-ERROR mode, the license timer value saved shall be the time remaining on the corresponding license error timer 126a-n, and (c) if the system 100 is in NO-LICENSE mode, the license timer value saved is zero.

At initialization or any other time that the value is not available in memory, the agent issues a timer request to the license manager 113. To generate a timer response, the manager 113 generally queries nonvolatile memory for the stored timer value 125. In some WSP applications, the manager queries all of the IP services interface cards with which the WSP is in contact. In either event, the lowest of these values (the value closest to expiration) is passed back to the agent in the timer response message. If any of the timer values from the processors are corrupted or if no processor responds with a timer value, the value in the timer response message to the agent is zero (indicating that the timer is expired). The agent uses the timer value in the response to set the timer value in memory.

Returning to FIG. 3, the agent in step 340 determines whether or not the manager 113 found that the serial number(s) match. When the serial number(s) do not match, the agent proceeds to step 316 (in which the license mode is set to the LICENSE-ERROR mode). When the serial number(s) match, the agent proceeds to step 344.

The agent in step 344 next determines if the feature limits defined in the feature mask were being exceeded (e.g. maximum ports in license file set to 1000, but greater than 1000 ports are administered in translation). When the control processor 102 is an SRP, the agent determines whether port boards other than an expansion interface board or maintenance test board is in the port network. When the limits are being exceeded, the agent proceeds to step 316. When the limits are not being exceeded, the agent proceeds to step 348.

In step 348, the agent determines whether the manager found that the license is expired. When the license is expired, the agent proceeds to step 316. When the license is not expired, the agent proceeds to step 352.

The agent next checks in step 352 the WSP, LSP, and SRP flags 260, 268, and 264 to see if the processor is configured as a WSP, LSP, or SRP. As will be appreciated, if the flag is not set the processor is not configured in the manner indicated by the flag. If it is, and the processor is active (i.e., not in standby mode), then the agent sets the license mode to LICENSE-ERROR in step 316. If it is not, the agent proceeds to step 356.

Returning again to step 336, the agent determines whether the manager found one or more unmatched serial numbers. If not, the agent proceeds to step 320 in which the license mode is set to the NO-LICENSE mode. If so, the agent proceeds to step 360.

If in either of steps 360 and 366, if the agent determines that the feature limits to be exceeded or the license to be expired, respectively, the agent proceeds to step 320.

If in both of steps 360 and 366, the agent determines that the feature limits are within licensed limits and the license is unexpired, respectively, the agent proceeds to step 370.

In step 370, the agent determines whether the processor is an active WSP, LSP, or SRP. If so, the agent proceeds to step 320. If not, the agent proceeds to step 356.

As shown by steps 336, 360, 366, and 370, the timer value is relevant only if there is a license error. If there are no errors, the switch goes to LICENSE-NORMAL mode, even if the license error timer is expired. If this were not the case, there would be no way to get out of the NO-LICENSE mode once the timer had expired.

Whenever the system 100 enters the LICENSE-NORMAL mode, the agent clears any LICENSE-ERROR or NO-LICENSE alarms, stops the license error timer (if running) and resets the timer to the full duration of the grace period, and makes a timer save request of this duration to the license manager.

Whenever the system 100 enters the LICENSE-ERROR mode, the agent generates a major (license-error) alarm, logs the error into the system security log, and initiates the license error countdown timer.

Whenever the system 100 enters NO-LICENSE mode, the agent generates a major (no-license) alarm (that is different from the alarm generated by the agent on entry into the LICENSE-ERROR mode), logs the error into the system security log, and provides a timer save request of zero hours to the license manager.

When the system 100 is operating in the NO-LICENSE or LICENSE-ERROR mode, the alarm is presented to the user in a suitable mode or modes. For example, a suitable error message can be displayed on the initial login screen for the system and/or a key or other indicator can be illuminated on one or more telephone sets and/or on another part of the system hardware. The agent can also provide an alarm notification to outside service personnel.

Figure 5:
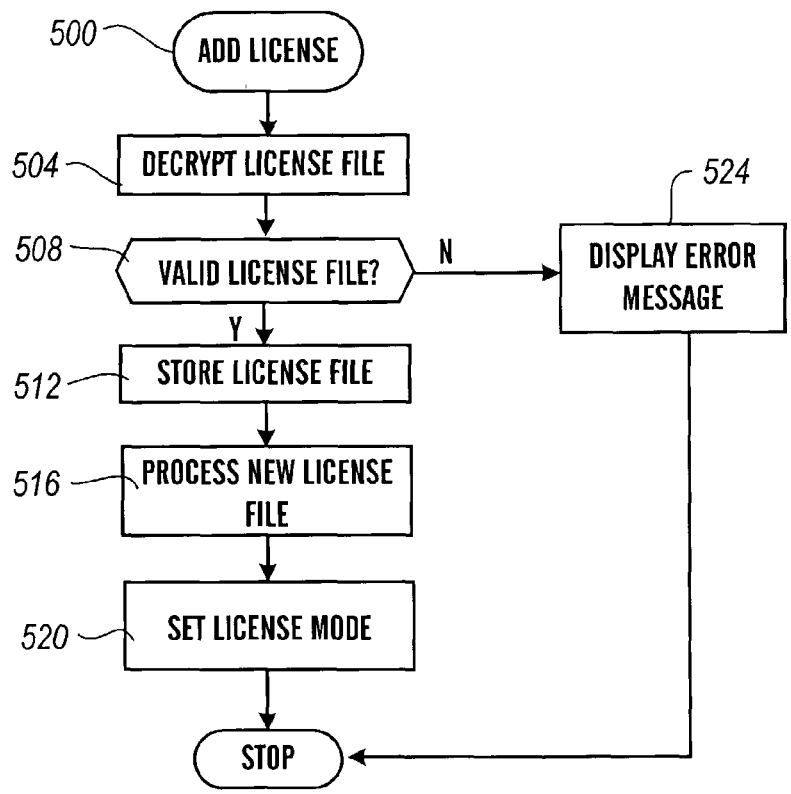
FIG. 5 is a flow chart depicting an algorithm of the license manager according to yet a further embodiment of the present invention.
Figure 6:
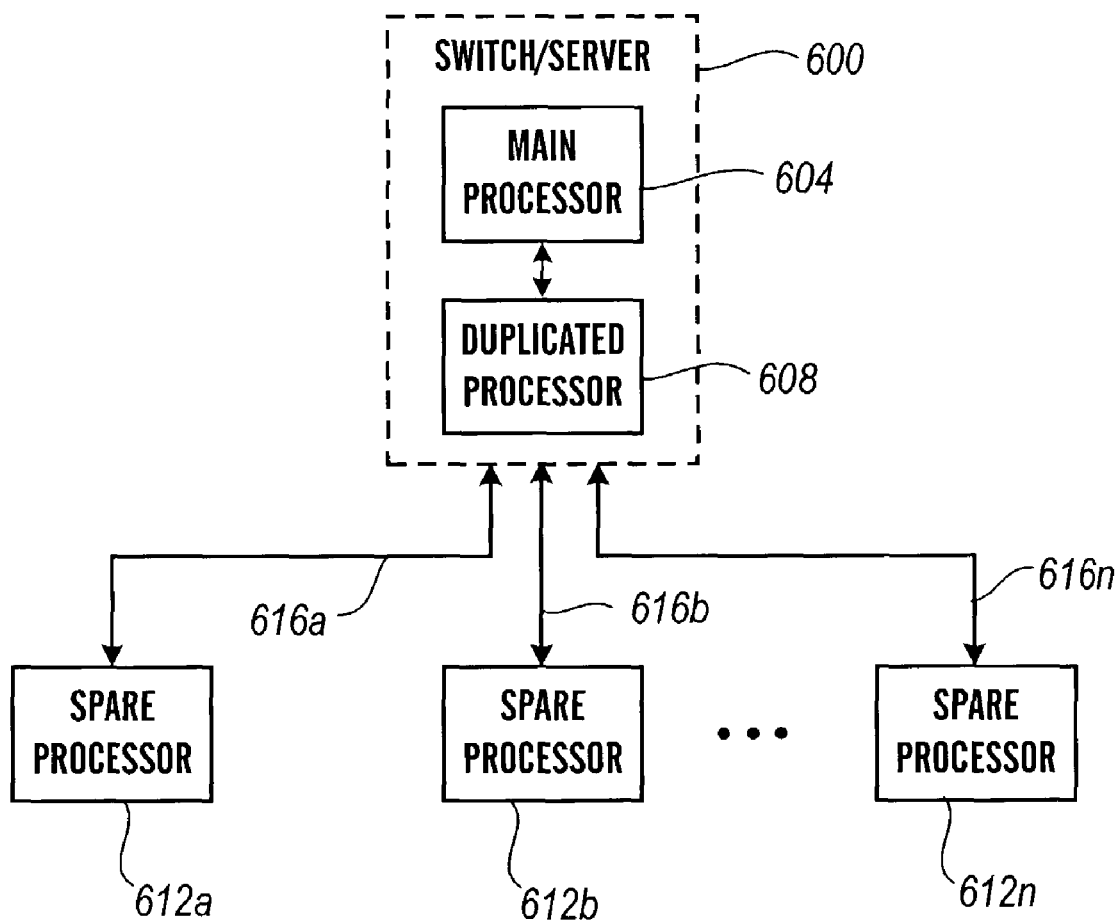
FIG. 6 is a conventional telecommunications architecture according to the prior art.

FIG. 5 depicts the operation of the license manager when a new license file is received by the spare telecommunication processor system 100. In step 500, the ADD LICENSE command is invoked. In step 504, the license manager decrypts the new license file.

In step 508, the license manager performs a series of checks to determine if the license file is valid. The license manager confirms that the serial number contained in the license file matches the serial number of the spare processor, that the license has not expired, that the version contained in the license file matches the software version loaded onto the processor system 100, that the offer category contained in the license file matches the offer category contained in the translation files of the system 100, data integrity using a checksum or other suitable approach, and that the license file length and format are correct.

If one or more of the preceding queries is not confirmed, the license manager proceeds to step 524 and displays a suitable error message to the user and terminates operation in step 528.

If each of the queries is confirmed, the new license file is stored in translation in step 512. The new license file overwrites the license file already in memory.

The application then processes the new license file feature mask in step 516. The application activates and deactivates features and sets new limits in accordance with the new license file feature mask.

Figure 3:
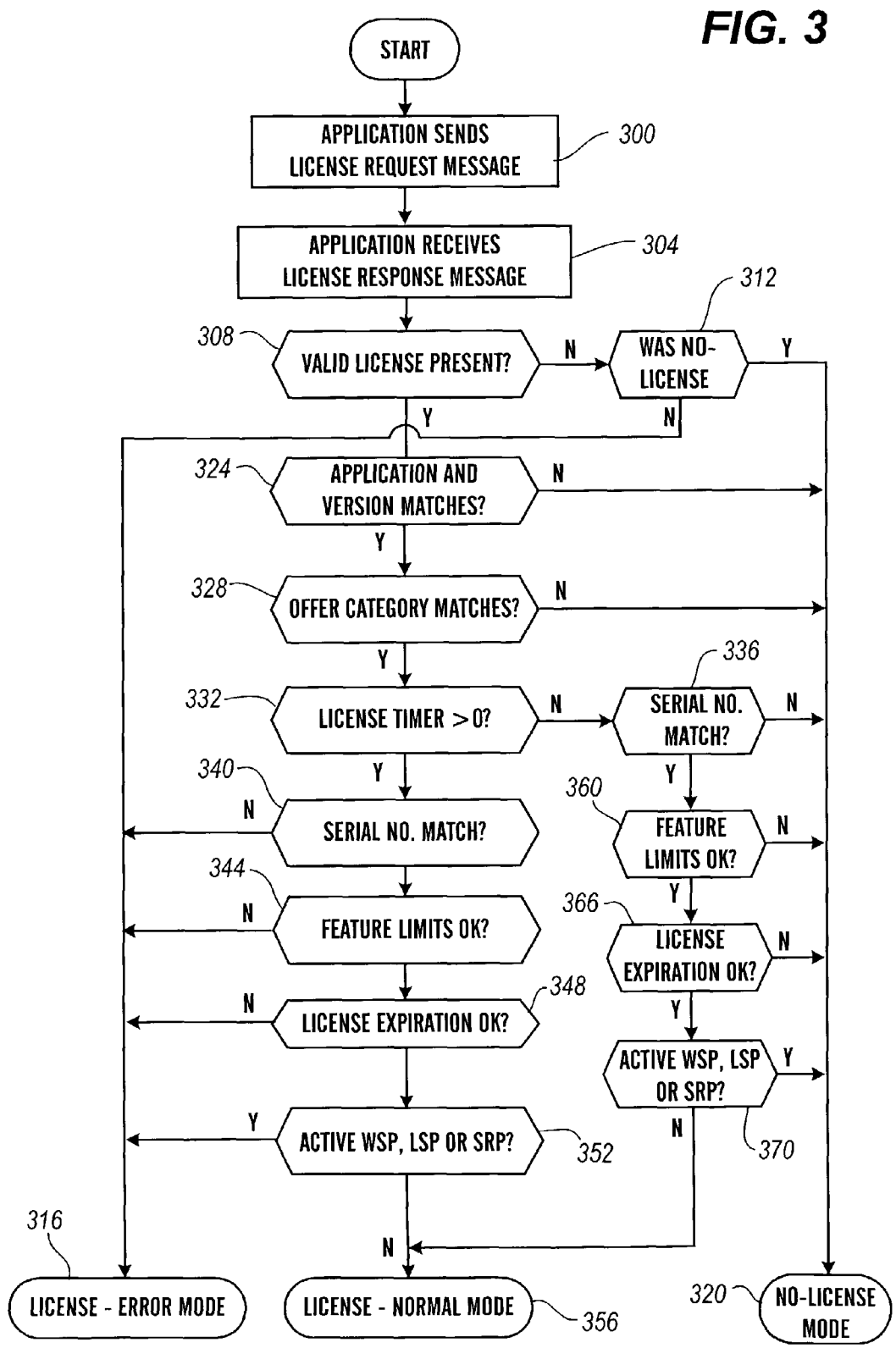
FIG. 3 is a flow chart depicting an algorithm of the telecommunication application according to yet another embodiment of the present invention.
Figure 4B:
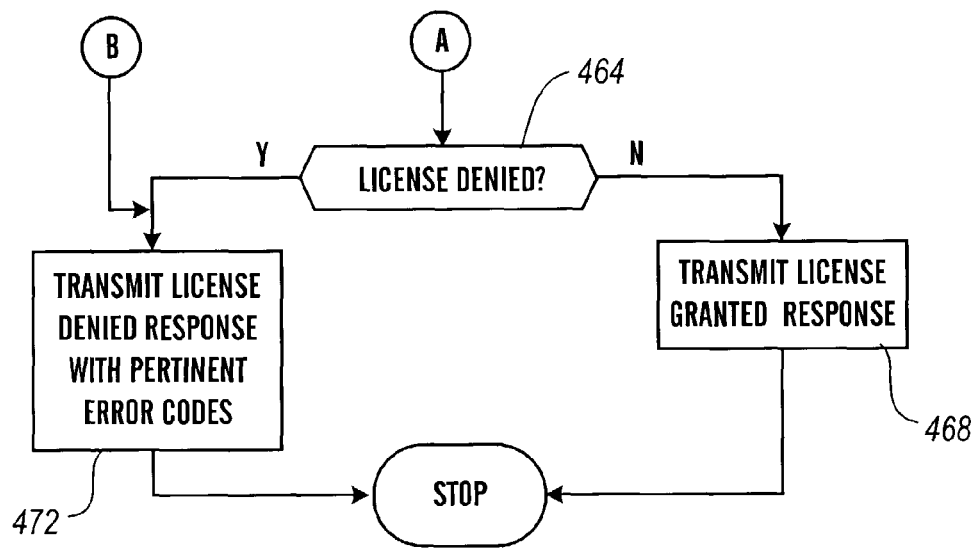

Next in step 520, the application sets the license mode as defined above and illustrated in FIG. 3.

A number of variations and modifications of the invention can be used. It would be possible to provide for some features of the invention without providing others.

For example in one alternative embodiment, the division of the various functions performed by the license manager, activation agent, timer, and mode setting agent modules are different. For example, the license manager can perform all or part of the licensing-related functions of the mode setting agent or the mode setting agent can perform all or part of the licensing-related functions of the license manager.

In another alternative embodiment, the mode setting agent 124 is not a part of the telecommunication application 114.

In yet another alternative embodiment, the license manager, activation agent, timer, and/or mode setting agent 124 are implemented as software and/or hardware, such as a logic circuit, e.g., an application specific integrated circuit.

In yet another alternative embodiment, any other applications running on the telecommunication processor system 100 can utilize the same mechanism as the mode setting agent 124 to determine if they are to be allowed to execute and what options they execute.

In yet a further alternative embodiment, the above techniques are applied with other telecommunication and/or non-telecommunication computational architectures having duplicated computational components. The computational components can be hardware, software, or a combination of the two.

In yet a further alternative embodiment, the license file can include fields for any number of unique identifiers for the same or differing types of hardware components. For example, for a license verification to be successful the license manager could require that there be matches for serial numbers not only of a control processor but also of an application specific integrated circuit or another type of hardware component.

In yet another embodiment, unsuccessful license verification causes only the contacting telecommunication application and not other successfully validated telecommunication applications or other parts of the system to be set to a mode other than the LICENSE NORMAL mode.

In yet another embodiment, when in LICENSE-NORMAL mode, if the mode setting agent does not receive a license response from a license manager within a predetermined time period of issuing a license request, the agent automatically enters the LICENSE-ERROR mode. When in the LICENSE-ERROR mode for reason other than failure to receive a license response, or at system initialization, if the agent does not receive a license response from the license manager within the predetermined period of issuing the license request, the system 100 shall enter NO-LICENSE mode.

In yet another embodiment, a separate timer 126*a-n* is not contained in each application but a common timer is used in the processor system 100 or an adjunct connected to the system 100.

In yet another embodiment, the present invention is used to enable/disable one or more applications executed by a server in addition to or in lieu of a switch. This embodiment is particularly useful in monitoring licensing in multi-mode contact centers which receive a broad variety of contact types, such as telephone calls, electronic mail, and contacts via a Web browser.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for controlling a right to use a computational component, comprising:
    (a) providing a primary computational component and at least one backup computational component, wherein, when the primary computational component is in an operational mode and validly licensed, the backup computational component is in a standby mode;
    (b) receiving a notification that at least one of the following is true:
        (i) that the primary computational component is no longer in the operational mode;
        (ii) that the backup computational component is in the operational mode; and
        (iii) that the backup computational component will be in the operational mode;
    (c) in response to the notification, determining that a license error has occurred; and
    (d) thereafter and while the primary computational component is not in the operational mode, reading a license error timer value associated with the backup computational component,
        (i) when the value of the timer is not at least a first value and when the backup computational component is otherwise validly licensed, permitting the backup computational component to be in the operational mode and
        (ii) when the value of the timer has reached at least the first value, no longer permitting the backup computational component to be in the operational mode.

2. The method of claim 1, further comprising:
    (e) retrieving at least a first identifier associated with the backup computational component;
    (f) reading a license file associated with the backup computational component to obtain a second identifier;
    (g) comparing the first and second identifiers;
        (i) when the first and second identifiers match, allowing the permitting step to be performed; and
        (ii) when the first and second identifiers do not match, causing the no longer permitting step to be performed.

3. The method of claim 1, wherein the primary computational component is in a first license mode when the primary computational component is in the operational mode and wherein the backup computational component is in a second different license mode after the permitting step is performed, wherein the second license mode is associated with a license error, and wherein a computational component in the second license mode is permitted to run for a predetermined period of time.

4. The method of claim 3, wherein the backup computational component is in the first license mode while the primary computational component is in the operational mode.

5. The method of claim 3, wherein the backup computational component is in a third different license mode after the no longer permitting step is performed, wherein the third license mode is associated with an invalid license, and wherein a computational component in the third license mode is substantially disabled.

6. The method of claim 1, wherein the reading step comprises:
    reading a flag to determine whether or not the backup computational component is the primary computational component.

7. The method of claim 1, further comprising when the timer value is not the first value:
    (e) repeating the reading step at least until the timer value is the first value, wherein step (ii) and not step (i) is performed when the primary computational component is not validly licensed.

8. The method of claim 2, wherein the license file comprises a unique identifier associated with the backup computational component, a backup flag, a platform type, and a platform identifier.

9. The method of claim 8, wherein the license file comprises a plurality of application definitions, each application definition corresponding to one of a plurality of applications.

10. The method of claim 9, wherein each of the application definitions comprises release information, license expiration information, one or more types of feature keyword information, wherein a first type of feature has a value and a lock and comprises a plurality of Digital Communication System or DCS call coverage, audible message waiting, vectoring, attendant vectoring, Asynchronous Transfer Mode or ATM, dial by name, echo cancellation, multimedia call handling, multiple call handling, caller identification, multifrequency signaling, Integrated Services Digital Network or ISDN network call redirection, centralized attendant, remote office, enhanced Direct Inward dialing or DID routing, survivable remote processor, time of day routing, tenant partitioning, hospitality announcements, Vector Directory Number or VDN of origin announcement, wideband switching, and wireless, wherein a second type of feature has a lower limit value and an upper limit value and comprises a plurality of logged-in agents, offer category, maximum numbers of concurrently registered IP stations, administered IP trunks, ports, and concurrently administered remote office stations/trunks, and call center release, logged-in automated call distribution or ACD agents, maximum currently registered IP stations, maximum administered IP trunks, offer category, maximum number of ports, maximum number of administered remote office trunks, and maximum number of mobile stations, and wherein a third type of feature has a product value, a release number, and a numeric value.

11. The method of claim 1, wherein the permitting step comprises the steps of:
    setting the backup computational component to a license error mode; and
    after a predetermined time, if the license error mode is not changed to a license-normal mode setting the backup computational component to a no-license mode.

12. A computer readable medium storing computer executable instructions for performing the steps of claim 1.

13. An integrated logic circuit comprising circuitry to perform the steps of claim 1.

14. A system for controlling a right to use a computational component, comprising:
(a) a backup computational component associated with a primary computational component, wherein, when the primary computational component is in an operational mode, the backup computational component is in a standby mode;
(b) an activation agent operable to determine when the primary computational component is no longer in the operational mode and generate a notification;
(c) a license error timer associated with the backup computational component to determine how long a license error is in effect; and
(d) a mode setting agent operable to determine that the backup computational component is in a license error mode in response to the notification, and, while the primary computational component is not in the operational mode, (i) permit the backup computational component to be in the operational mode when the value of the timer has not yet reached at least a first value and (ii) not to permit the backup computational component to be in the operational mode when the value of the timer has reached at least the first value.

15. The system of claim 14, further comprising:
(e) a license manager operable to retrieve at least a first identifier associated with the backup computational component, read a license file associated with the backup computational component to obtain a second identifier, compare the first and second identifiers, and allow the permitting operation to be performed when the first and second identifiers match and not allow the permitting operation to be performed when the first and second identifiers do not match.

16. The system of claim 14, wherein the primary computational component is in a first license mode when the primary computational component is in the operational mode, wherein the backup computational component is in a second different license mode after the permitting operation is performed and wherein the second license mode is associated with a license error, and wherein a computational component in the second license mode is permitted to run for a predetermined period of time.

17. The system of claim 16, wherein the backup computational component is in the first license mode while the primary computational component is in the operational mode.

18. The system of claim 17, wherein the backup computational component is in a third different license mode after the not permitting operation is performed, wherein the third license mode is associated with an invalid license, and wherein a computational component in the third license mode is substantially disabled.

19. The system of claim 15, wherein the license manager is operable to read a flag to determine whether or not the backup computational component is the primary computational component.

20. The system of claim 14, wherein the mode setting agent is operable to disable the backup computational component when the timer value reaches the first value, and wherein operation (ii) and not operation (i) is performed when the primary computational component is not validly licensed.

21. The system of claim 15, wherein the license file comprises a unique identifier associated with the backup computational component, a backup flag, a platform type, and a platform identifier.

22. The system of claim 21, wherein the license file comprises a plurality of application definitions, each application definition corresponding to one of a plurality of applications.

23. The system of claim 22, wherein each of the application definitions comprises release information, license expiration information, and one or more types feature keyword information.

24. The system of claim 14, wherein the mode setting agent is operable to set the backup computational component to a license error mode when the timer value is not the first value and set the backup computational component to a no-license mode, when the timer value is the first value.

25. A computer readable medium comprising a license file for use in controlling activation of a computational component, comprising:
at least one unique identifier corresponding to at least a first computational component and
a backup flag indicating whether or not a computational system associated with the first computational component is a primary or backup system.

26. The computer readable medium of claim 25, wherein the license file further includes at least a second unique identifier corresponding to at least a second computational component.

27. The computer readable medium of claim 25, wherein the license file further includes at least one application definition comprising expiration information relating to expiration of a license associated with the license file, release information, and feature keyword information.

28. The computer readable medium of claim 25, wherein the license file further includes platform-type information and a platform identifier.

29. The computer readable medium of claim 25, wherein the backup flag comprises at least first and second flags, each of which is indicative of a different type of backup system.

30. The computer readable medium of claim 25, wherein the backup flag comprises a first flag indicating whether or not the first computational component is a survivable remote spare processor, a second flag indicating whether or not the first computational component is a local area network spare processor, and a third flag indicating whether or not the first computational component is a wide area network spare processor.

* * * * *